United States Patent
Davidson

(10) Patent No.: US 12,445,762 B2
(45) Date of Patent: *Oct. 14, 2025

(54) REMOTE CONTROL OF EAR MOUNTED AUDIO DEVICES

(71) Applicant: Curt Davidson, San Marcos, CA (US)

(72) Inventor: Curt Davidson, San Marcos, CA (US)

( * ) Notice: Subject to any disclaimer, the term of this patent is extended or adjusted under 35 U.S.C. 154(b) by 26 days.

This patent is subject to a terminal disclaimer.

(21) Appl. No.: 18/380,121

(22) Filed: Oct. 13, 2023

(65) Prior Publication Data

US 2024/0040300 A1 Feb. 1, 2024

Related U.S. Application Data

(63) Continuation of application No. 18/107,398, filed on Feb. 8, 2023, now Pat. No. 11,818,532, which is a continuation of application No. 17/691,020, filed on Mar. 9, 2022, now Pat. No. 11,595,746.

(51) Int. Cl.
  *H04R 1/10* (2006.01)
  *G08C 17/02* (2006.01)

(52) U.S. Cl.
  CPC ........... *H04R 1/1041* (2013.01); *G08C 17/02* (2013.01); *H04R 1/1091* (2013.01); *G08C 2201/93* (2013.01)

(58) Field of Classification Search
  CPC ..... H04R 1/1041; H04R 1/1091; G08C 17/02
  See application file for complete search history.

(56) References Cited

U.S. PATENT DOCUMENTS

| | | | |
|---|---|---|---|
| 2016/0029114 A1* | 1/2016 | Chen | H04W 4/80 381/74 |
| 2019/0346969 A1* | 11/2019 | Yip | G06F 3/0436 |
| 2020/0007977 A1* | 1/2020 | Gong | H04R 29/001 |
| 2020/0052667 A1* | 2/2020 | Jeon | H04M 1/72454 |
| 2020/0226919 A1* | 7/2020 | Salem | H04N 23/66 |
| 2021/0090410 A1* | 3/2021 | Albright | G06F 18/2155 |
| 2021/0297797 A1* | 9/2021 | Yang | H04R 25/70 |

* cited by examiner

*Primary Examiner* — Simon King
(74) *Attorney, Agent, or Firm* — James A. Italia; Italia IP

(57) ABSTRACT

A remote controller for a sound delivery system such as hearing aids and headsets is shown and described. The remote controller has control buttons corresponding to control functions of the sound delivery system, a signal generator, a signal transmitter, and a power supply. The sound delivery system is worn on the head or ears, and includes speakers, sounding controlling elements, a signal receiver for communication with the remote controller, a power supply, and audible and/or visible beacons for implementing a locator function if misplaced or lost. The remote controller may be a stand alone, dedicated component physically separate from the sound delivery system, or alternatively, may be implemented as an application downloadable to a cellular telephone. The application causes manual controls corresponding to those of a hearing aid or stereophonic controls to appear on a screen of the cellular telephone.

11 Claims, 3 Drawing Sheets

REMOTE CONTROL OF EAR MOUNTED AUDIO DEVICES

CROSS-REFERENCE TO RELATED APPLICATIONS

This is a continuation application of application Ser. No. 18/107,398 which has a filing date of Feb. 8, 2023, which was a continuation application of application Ser. No. 17/691,020 which has a filing date of Mar. 9, 2022, the contents of which are incorporated herein by this reference.

FIELD OF THE INVENTION

The present invention relates to sound transmission, and more particularly, to improving manual adjustment control for ear mounted audio devices such as hearing aids.

BACKGROUND OF THE INVENTION

Technology for controlling head worn sound delivery systems such as hearing aids and headsets allows for adjustment of various parameters of delivered sound, where parameters encompass sound volume, various aspects of sound characteristics, and on-off control. As head worn systems are commercially available either as stand-alone items or alternatively as separate from sound source equipment with which they work, manual controls for adjusting the various parameters are usually built into the head worn system.

It can be inconvenient or objectionably difficult to gain access to some controls with the sound delivery system in place on the head of the user, because there is typically no direct line of sight enabling the desired control to be operated. Also, some controls are physically so small and may be located so close to others that it is difficult to operate them manually despite controls being operated by simple pressing of the input interface element.

There remains a need to enable ready operation of sound parameter controls that do not require removal of a sound delivery system from the head.

SUMMARY OF THE INVENTION

The present invention addresses the above stated need by providing a hand held remote or independent controller separate from an associated head worn sound delivery system. The remote controller has pushbutton type controls and communicates wirelessly with the controlled sound delivery system. The remote controller may be a dedicated device or alternatively, may be implemented as an application residing in a cellular telephone or other portable personal communications device.

An object of the present invention, where the sound delivery system uses at least one hearing aid, is to reduce the number or bulk of components on a hearing aid, or both, so that the hearing aid is of minimal size and less conspicuous than present day hearing aids.

It is an object of the invention to relieve a user of the necessity of removing, reposition, replacing, or moving a ear contracting sound delivery device in order to initiate, extinguish, or modify sounds delivered by the sound delivery device.

The present invention provides improved elements and arrangements thereof by apparatus for the purposes described which is inexpensive, dependable, and fully effective in accomplishing its intended purposes.

These and other objects of the present invention will become readily apparent upon further review of the following specification and drawings.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION

Figure 1:
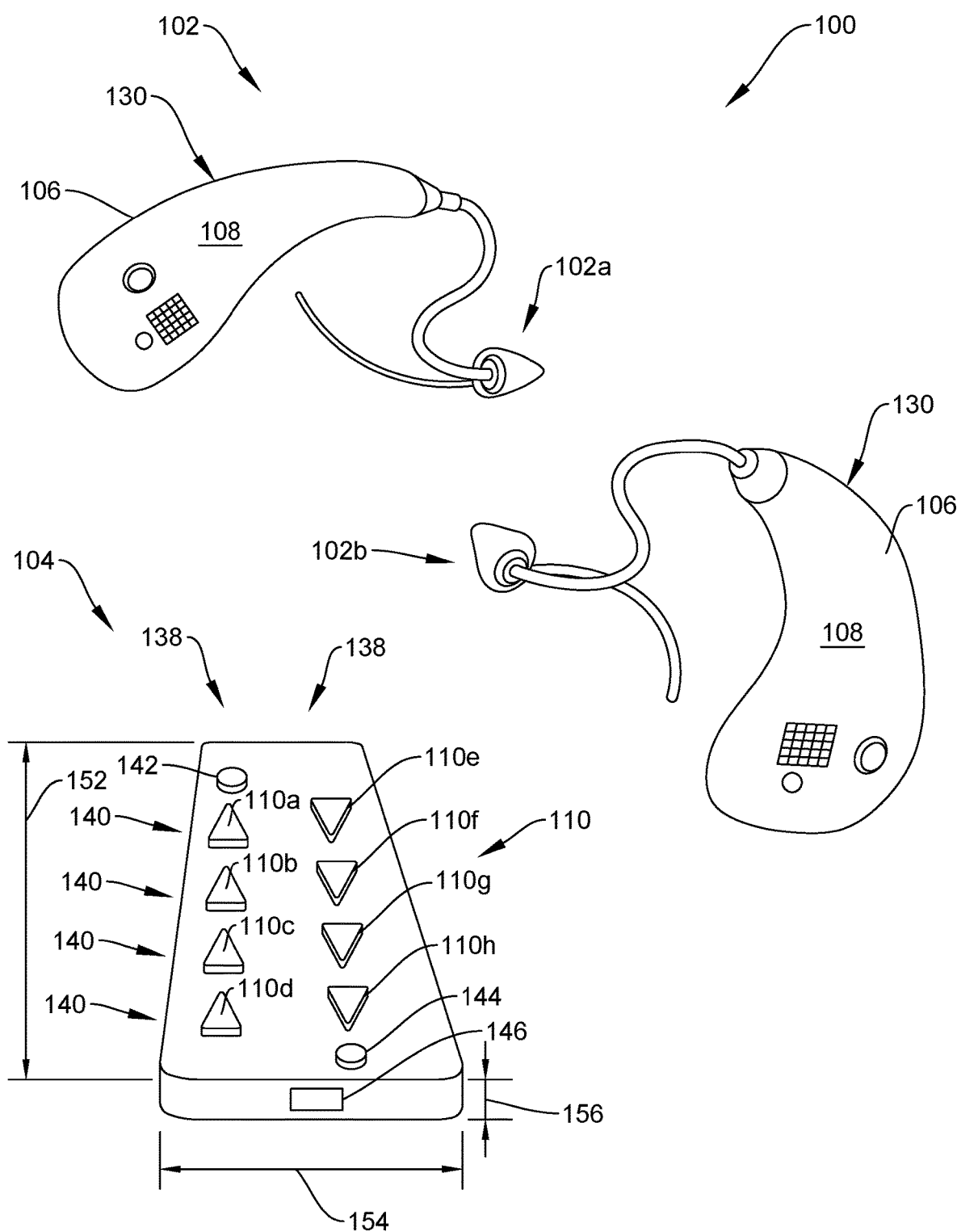
FIG. 1 is a perspective view of components of a first embodiment of the invention, showing an exemplary outer appearance of these components.
Figure 2:
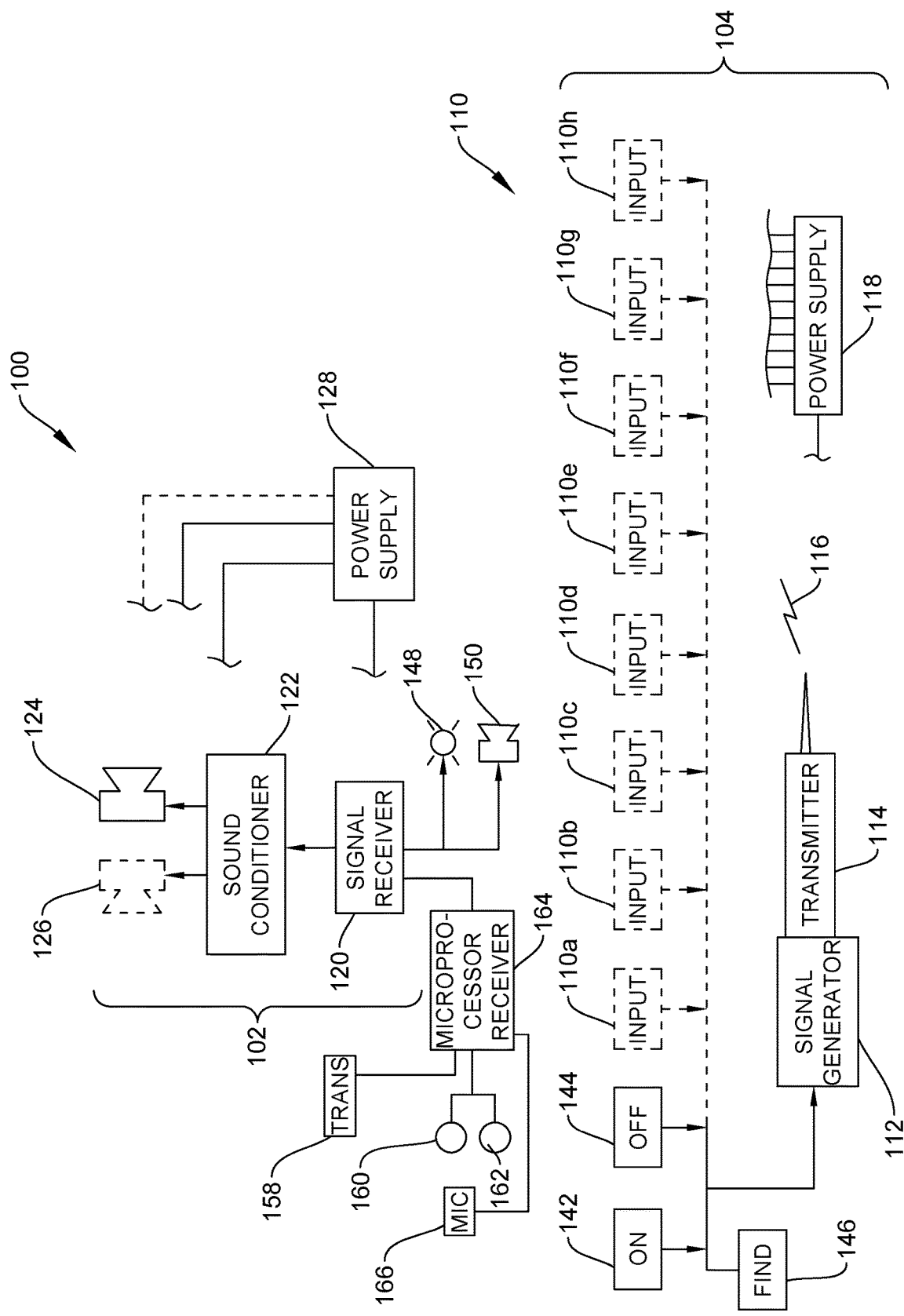
FIG. 2 is a schematic diagram of electrically operated components of the invention, wherein arrowheads where used indicate which components provide inputs to associated components.

In this description, FIG. 1 shows an outer appearance of referenced components of one specific embodiment of the invention, and FIG. 2 schematically shows electrically operated components and electrical connections applicable to various embodiments. In the first embodiment, an ear contacting sound delivery device comprises at least one hearing aid (two are shown, and may be identical or alternatively, may be mirror image of one another). While hearing aids are typically used in pairs, one for each ear, there exist situations in which only one hearing aid is needed. One example is where hearing is impaired in only one ear. Another example is where an observer is monitoring two different speakers or sources of sound, and the need to hear one more clearly arises from time to time.

Some electrical connections are shown truncated in the schematic of FIG. 2. Referring now to FIGS. 1 and 2, according to at least one aspect of the invention, there is shown a combination 100 of an ear contacting sound delivery device 102 comprising at least one of a right speaker 102a and a left speaker 102b for emitting sound to one or both ears of a user (not shown), and a remote controller 104 physically separate from and independent of ear contacting sound delivery device 102. Remote controller 104 is configured to adjust sounds emitted by right speaker 102a and left speaker 102b. Remote controller 104 may comprise a body 106 having an external surface 108, at least two sound control input operators 110 accessible to haptic inputs on external surface 108 (FIG. 1) of body 106 (FIG. 1), a signal generator 112 and transmitter 114 for transmitting at least one control signal 116 responsively to the user operating sound control input operators 110, and a power supply 116 operably connected to sound control input operators 110, signal generator 112, and transmitter 114.

Sound delivery device 102 may comprise a signal receiver 120 for receiving signals 116 transmitted by signal generator 112, at least one speaker 124 or 126, and at least one sound conditioner 122 configured to modify sound outputs of, selectively, a right speaker 124 and a left speaker 126, responsively to signals 116 transmitted by signal generator 112, and a power supply 128 operably connected to signal receiver 120, the at least one speaker 124 (and optionally, speaker 126), and sound conditioner 122.

Orientational terms such as left, right, top, bottom, vertical, and horizontal refer to the subject drawing as viewed by an observer. The drawing figures depict their subject matter in orientations of normal use, which could obviously change with changes in orientation and position of the novel remote control. Therefore, orientational terms must be understood to provide semantic basis for purposes of description, and do not limit the invention or its component parts in any particular way.

Communications using signals 116 may use Wi-Fi or Bluetooth or other low powered systems.

In the various embodiments encompassed herein, that portion of the novel system delivering sound to the user contacts the ears, with sound projected toward or into the ear canal. Contact of the ear is held to satisfy the description as "head worn" as the ears are connected to the head of the user.

The various subcomponents of the invention are known. Invention lies in arrangement of these subcomponents to function as a sound delivery device (i.e., the head worn component) and a remote controller thereof. Electrical connections are shown functionally in FIG. 2 and in textual description, rather than being shown literally. For example, drawn connections will be understood to encompass that number of individual electrical conductors required for operability of the recited components. In a similar vein, the phrase "configured to" will be understood to encompass all necessary conductors, connections, and supporting apparatus required for operation as described. Similarly, components shown abutting will be understood to be complete, operable, and functionally connected.

Sound adjustment may encompass volume control and white noise control, and in embodiments other than that of FIG. 1, sound characteristics such as treble and base levels, among others. These and other sound characteristics and their control are widely known in the sound reproduction arts.

The at least two sound control operators, if only two were present, would include "on" and "off" operators shown at the lower left of FIG. 2. Functions of operators 110 shown as optional in FIG. 2 due to rendering in dashed lines will be specified hereinafter.

Remote controller 104 may be configured to receive manual input commands corresponding to at least two different aspects of sound. Sound conditioner 112 may be configured to modify sound outputs according to the manual input commands and modify sound outputs of right speaker 124 independently of left speaker 126. Aspects of sound include right-left volume proportion or balance, treble-bass adjustment, etc.

In the embodiment of FIG. 1, ear contacting sound delivery device 102 comprises hearing aids 130 configured to engage an ear canal of a user, and the at least two sound control input operators 110 of remote controller 104 comprise push buttons each responsive to being pressed to operate. Locating input operators 110 on remote controller 104 reduces complication and bulk of hearing aids 130, with the result that hearing aids 130 may be smaller and less conspicuous than corresponding prior art hearing aids.

Figure 3:
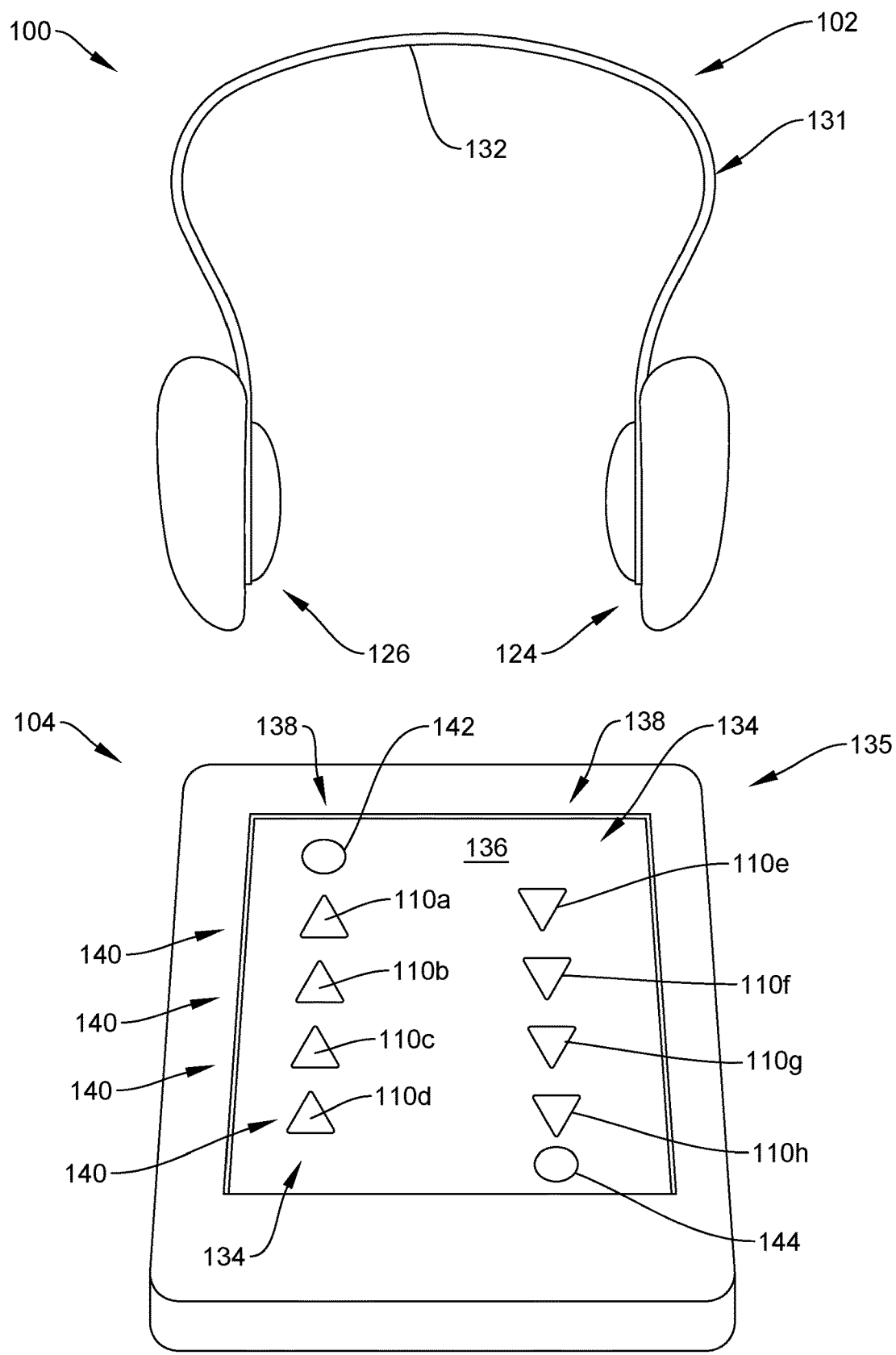
FIG. 3 is a perspective view of components of a second embodiment of the invention, showing an exemplary outer appearance of these components.

Turning now to FIG. 3, ear contacting sound delivery device 102 is a headset 131 including right ear contacting speaker 124, left ear contacting speaker 126, and a spanning member 132 connecting right ear contacting speaker 124 and left ear contacting speaker 126 and maintaining right ear contacting speaker 124 against the right ear of the user and maintaining left ear contacting speaker 126 against the left ear of the user. The at least two sound control input operators 110 of remote controller 104 comprise push buttons each responsive to being pressed to operate. In the embodiment of FIG. 3, wherein ear contacting sound delivery device 102 is a hearing aid 130 configured to engage an ear canal of a user, remote controller 104 is a cellular telephone 135. The at least two sound control input operators 110 of remote controller 104 comprise icons 134 on a touch responsive screen 136 of the cellular telephone, each responsive to being contacted by a finger of the user to operate. The cellular telephone includes computer instructions to effect transmission of operating signals 116 from the cellular telephone to signal receiver 120 of the headset 131. It should be understood that ear contacting sound delivery device 102, its signal receiver 120, its sound conditioner 122, and its power supply 128 are present in both embodiments using hearing aids, and also in embodiments using headsets. The same holds true of the corresponding components of remote controller 104 of FIG. 3 relative to those of FIG. 2 as these components are inherent in a cellular telephone. Icons 134 are counterparts of the push buttons of controller 104 not only in function but also in that they operate responsive to pressure of finger pressure, and thus may be regarded as push buttons. The computer instruction include a computer executable or implementable program or application which is functional to implement data processing steps for accomplishing functions listed herein.

It should be made explicit that in an unillustrated embodiment of the invention, hearing aids 130 could be used with a cellular telephone serving as remote controller 104 (provided of course that a suitable controlling application has been downloaded thereto). Similarly, the physical, stand alone remote controller 104 of FIG. 1 could be used to control a headset 131.

Where remote controller 104 is a cellular telephone, the plurality of sound control input operators 110 comprise icons 134 on touch responsive screen 136 of the cellular telephone, each responsive to being contacted by a finger of the user to operate. The cellular telephone includes computer instructions to effect transmission of operating signals from the cellular telephone to signal receiver 120 of the hearing aid.

Combination 100 may be provided with a locator feature for locating a misplaced hearing aid. To this end, combination 100 may further comprise a locator push button 146 on remote controller 104. Push button 146 is configured to generate at least one of an audible signal and a visible signal in the hearing aid. Combination 100 also may comprise at least one of a visible beacon 148 and an audible beacon 150 on the hearing aid. Locator push button 146 generates a signal 116 from signal generator 112 and transmitted by transmitter 114. Corresponding operating signals are then generated by signal receiver 120 of sound delivery device 102, or alternatively by sound conditioner 122 or any other component having processing capability of turning signal 116 into an operating signal for visible and audible beacons 148, 150.

The invention may also be viewed as remote controller 104 of FIG. 1. In FIG. 1, there is seen remote controller 104 for an ear contacting sound delivery device 102 (which may be either the hearing aid of FIG. 1 or the headset 131 of FIG. 3), having at least one of right speaker 124 for mounting in contact with a right ear of a user and left speaker 126 for mounting in contact with a left ear of the user. Remote controller 104 may comprise body 106 having external surface 108, at least ten sound control input operators 110 accessible to haptic inputs on external surface 108 of body 106, signal generator 112 and transmitter 114 configured to transmit a plurality of control signals 116 responsively to the user operating sound control input operators 110, wherein signal generator 112 is in communication with sound control input operators 110; and power supply 128 operably connected to sound control input operators 110 and signal generator, 112, and transmitter 114. Ten sound control input operators 110 are shown in FIG. 1. The ten functions enabled in the arrangement of FIG. 1 include "on" and "off", increasing and decreasing volume for the right and left speakers 124, 126 (control is for each side independently), and increasing and decreasing white noise levels for right and left speakers. This arrangement satisfies control needs for typical hearing aids.

Remote controller 104 may be configured to receive manual input commands corresponding to a plurality of different aspects of sound, and sound conditioner 122 may be configured to modify sound outputs according to the manual input commands and modify sound outputs of right speaker 124 independently of left speaker 126. Sound volume and white noise levels provide one example of modifying sound outputs, but other schemes exist. For example, where the sound delivery device is a stereophonic headset 131 (FIG. 2), aspects of sound may include right-left side volume balance and bass-treble adjustments.

The at least ten sound control input operators 110 of remote controller 104 may comprise push buttons each responsive to being pressed to operate. This causes the input operators to conform to conventional practice in hearing aids.

In an option which replaces separate "on" and "off" push buttons with one, one of sound control input operators 110 is an on-off pushbutton utilizing toggle logic. This reduces the number of control operators 110 necessary, and utilizes a known control scheme.

As seen in both FIGS. 1 and 3, sound control input operators 110 (including icons 134 of FIG. 3) may be arrayed on one flat surface (i.e., external surface 108) of body 106 in two vertical columns and a plurality of horizontal rows. Sound control input operators 110 (and icons 134) may include a first sound control input operator 110a (shown in FIG. 1 and may also apply to FIG. 3) configured to raise sound volume of right speaker 124, a second sound control input operator 110b configured to raise sound volume of left speaker 126, a third sound control input operator 110c configured to raise white noise volume of right speaker 124, a fourth sound control input operator 110d configured to raise white noise volume of left speaker 126, a fifth sound control input operator 110e configured to lower sound volume of right speaker 124, a sixth sound control input operator 110f configured to lower sound volume of left speaker 126, a seventh sound control input operator 110g configured to lower white noise volume of right speaker 124, and an eighth sound control input operator 110h configured to lower white noise volume of left speaker 126. In this scheme, all parameter increasing push buttons are on the left. This is one of a number of possible logic schemes of sound control input operators 110. It would also be possible for example to locate all push buttons controlling left speaker 126 on the left of the array, and all push buttons controlling right speaker 124 on the right.

Unless otherwise indicated, the terms "first", "second", etc., are used herein merely as labels, and are not intended to impose ordinal, positional, or hierarchical requirements on the items to which these terms refer. Moreover, reference to, e.g., a "second" item does not either require or preclude the existence of, e.g., a "first" or lower-numbered item, and/or, e.g., a "third" or higher-numbered item. This pertains to both components of the various embodiments and also to the embodiments themselves.

In the array illustrated in FIGS. 1 and 3, first sound control input operator 110a, second sound control input operator 110b, third sound control input operator 110c, and fourth sound control input operator 110d occupy one vertical column 138. Fifth sound control operator 110e, sixth sound control input operator 110f, seventh sound control input operator 110g, and eighth sound control input operator 110h occupy another vertical column 139 adjacent the other vertical column 138.

Remote controller 104 further includes an on input operator 142 configured to turn right speaker 124 and left speaker 126 on. "On" input operator 142 may be located at the top of a left column 138 and an "off" input operator 144 configured to turn right speaker 124 and left speaker 126 off "Off" input operator 144 may be located at the bottom of a right column 138. This arrangement places increase and decrease functions for any one side intuitively to the right or left of one another.

In the above described array, left column 138 may be staggered vertically relative to right column 138, wherein there is no input operator to the right of the "on" input operator and no input operator to the left of the "off" input operator. This dissimilarity imparts identity and recognizability to the "on" and "off" functions.

Icons 134 associated with a function increasing a control parameter may appear on touch responsive screen 136 as arrowheads pointing upwardly, and icons 134 associated with a function decreasing a control parameter may appear on touch responsive screen 136 as arrowheads pointing downwardly. This arrangement is both familiar and also intuitive.

In a further feature, and referring to FIG. 2, an ear contacting sound delivery device may be modified to facilitate hands free telephone calls in the manner of a wireless Bluetooth headphone. To this end, hearing aid 130 may serve as an ear contacting sound delivery device 102 comprising signal receiver 120, sound conditioner 122, at least one of right speaker 124 and left speaker 126, a transmitter 158, an on-off control 160, a sound volume control 162, power supply 128, a microphone 166, and a microprocessor 164 in communication with signal receiver 120, sound conditioner 122, the at least one of right speaker 124 and left speaker 126, transmitter 158, on-off control 160, sound volume control 162, power supply 128 and microphone 166. Sounds received by microphone 166 are transmitted to transmitter 158 for subsequent transmission to a cellular telephone (e.g., cellular telephone 135), thereby enabling a user to conduct a telephone conversation without having to hold cellular telephone 135.

Parameters of sound delivery such as volume that are subject to increase and decrease via controls may be continuously adjusted, or alternatively, adjusted in discrete steps.

In a preferred implementation, and referring again to FIG. 1, remote controller 104 may have a length 152 of two and one half inches, a width 154 of one inch, and a thickness 156 of one quarter inch.

The present invention is susceptible to modifications and variations which may be introduced thereto without departing from the inventive concepts. For example, it is contemplated that the ear mounted hearing devices could be charged using either near-field or far-field charging technology such that a user's separate remote control or cellular device would be able to charge the battery contained in hearing devices in wireless manner. In addition, for use with general purpose headset ear speakers, it would be possible to add manual controllers of functions other than those explicitly mentioned herein, such as a balance control for increasing proportional input selectively to the right speaker and the left speaker of any individual channel of a multi-channel input system, or a treble-bass proportional input to the right speaker and the left speaker, among others. A number of characteristics of audible content are known in the field of sound and music reproduction. Any one of these or any combination of these may be the subject of controls and control operators, as described priorly.

While the present invention has been described in connection with what is considered the most practical and preferred embodiment, it is to be understood that the present invention is not to be limited to the disclosed arrangements, but is intended to cover various arrangements which are included within the spirit and scope of the broadest possible interpretation of the appended claims so as to encompass all modifications and equivalent arrangements which are possible.

I claim:

1. A cellular telephone based remote controller for an ear contacting sound delivery device comprising at least one of a right speaker for mounting in contact with a right ear of a user and a left speaker for mounting in contact with a left ear of the user, the remote controller comprising:
a body having an external surface;
a plurality of sound control input operators accessible to haptic inputs on the external surface of the body; and
a signal generator and a transmitter configured to transmit a plurality of control signals responsively to the user operating the sound control input operators, wherein the signal generator is in communication with the sound control input operators.

2. The cellular telephone based remote controller of claim 1, wherein
the remote controller is configured to receive manual input commands corresponding to a plurality of different aspects of sound; and
the sound conditioner is configured to
modify sound outputs according to the manual input commands and
modify sound outputs of the right speaker independently of the left speaker.

3. The cellular telephone based remote controller of claim 1, wherein the at least ten sound control input operators of the remote controller comprise push buttons each responsive to being pressed to operate.

4. The cellular telephone based remote controller of claim 1, wherein one of the sound control input operators is an on-off pushbutton utilizing toggle logic.

5. The cellular telephone based remote controller of claim 1, wherein
the sound control input operators are arrayed on one flat surface of the body in two vertical columns and a plurality of horizontal rows, and
the sound control input operators include a first sound control input operator configured to raise sound volume of the right speaker, a second sound control input operator configured to raise sound volume of the left speaker, a third sound control input operator configured to raise white noise volume of the right speaker, a fourth sound control input operator configured to raise white noise volume of the left speaker, a fifth sound control input operator configured to lower sound volume of the right speaker, a sixth sound control input operator configured to lower sound volume of the left speaker, a seventh sound control input operator configured to lower white noise volume of the right speaker, and an eighth sound control input operator configured to lower white noise volume of the left speaker.

6. The cellular telephone based remote controller of claim 5, wherein
the first sound control input operator, the second sound control input operator, the third sound control input operator, and the fourth sound control input operator occupy one said vertical column,
the fifth sound control operator, the sixth sound control input operator, the seventh sound control input operator, and the eighth sound control input operator occupy another said vertical column adjacent the other said vertical column, and
the remote controller further includes an on input operator configured to turn the right speaker and the left speaker on, the on input operator located at a top of a left column and an off input operator configured to turn the right speaker and the left speaker off, the off input operator located at a bottom of a right column.

7. The cellular telephone based remote controller of claim 6, wherein the left column is staggered vertically relative to the right column, wherein there is no input operator to the right of the "on" input operator and no input operator to the left of the "off" input operator.

8. The cellular telephone based remote controller of claim 1, the plurality of sound control input operators comprise icons on a touch responsive screen of the cellular telephone each responsive to being contacted by a finger of the user to operate, and the cellular telephone includes computer instructions to effect transmission of operating signals from the cellular telephone to the signal receiver of the hearing aid.

9. The cellular telephone based remote controller of claim 8, wherein the icons associated with a function increasing a control parameter appear on the touch responsive screen as arrowheads pointing upwardly, and the icons associated with a function decreasing a control parameter appear on the touch responsive screen as arrowheads pointing downwardly.

10. The cellular telephone based remote controller of claim 1, further comprising a locator push button configured to generate at least one of an audible signal and a visible signal in the hearing aid, whereby if misplaced, location of the hearing aid will be discernible to the user.

11. The cellular telephone based remote controller of claim 1, wherein the ear contacting sound delivery device includes a microphone, wherein sounds received by the microphone are transmitted to the transmitter for subsequent transmission to said cellular telephone, thereby enabling a user to conduct a telephone conversation without having to hold the cellular telephone.

* * * * *